Figure 1:
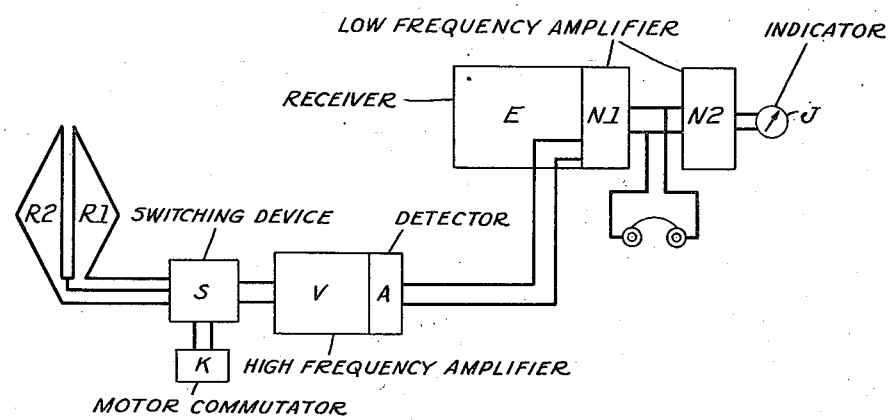

Aug. 22, 1939.  E. KRAMAR  2,170,659

DIRECTION FINDING ARRANGEMENT

Filed Jan. 23, 1936

Inventor:
ERNST KRAMAR

By E. D. Phinney
Attorney.

Patented Aug. 22, 1939

2,170,659

UNITED STATES PATENT OFFICE 2,170,659

DIRECTION FINDING ARRANGEMENT

Ernst Kramar, Berlin-Tempelhof, Germany, assignor to C. Lorenz Aktiengesellschaft, Berlin-Tempelhof, Germany, a company Application January 23, 1936, Serial No. 60,378
In Germany January 24, 1935

2 Claims. (Cl. 250—11)

The invention relates to direction finding devices arranged on an aircraft, vessel or other means of transportation in order to enable the pilot to ascertain at any moment whether his vehicle is on the proper course with respect to a desired destination. Arrangements of this kind are known which have two frame aerials different from each other as regards the sense of winding. These aerials are in conjunction with a high antenna connected alternately to a high frequency receiver. Instead of providing a high antenna the high antenna effect of the frame aerials may be used. The same result is obtainable by earthing the frame aerials alternately at one of their ends.

With these arrangements a measuring method is employed which consists in ascertaining the field intensity each time the switching over of the two aerials is effected, that is, each time one aerial becomes connected to the receiver whilst the other becomes disconnected therefrom, and in comparing the two intensity indications with each other. The vehicle is moving in the direction of the aim whenever the two indications are of the same intensity. Such switching over of the aerials may be effected with the aid of a collector driven by a motor, or with the aid of an alternating current. The period during which the high antenna effect is each time connected to the end of either aerial is the same in each case. Such arrangements are thus adapted for visual indication only.

It is known also to employ on the receiving side a certain method used on the transmitting side of radio beacons, namely, the method of keying dots and dashes alternately, this being accomplished on the receiving side by keying a directional antenna system alternately in the dot and dash-rhythm or a suitable other rhythm. In this way an audible indication can be accomplished but no visual one.

Since especially the pilots of airplanes like to use either a visual indication or an audible one or both simultaneously according to circumstances and for security, arrangements are wanted which enable either an audible or a visual indication to be employed at will. In order to permit such operation according to the invention it is proposed to make use of devices such as disclosed in the copending application Serial No. 698,619, filed November 18, 1933, for Electric indicators for comparing field intensities, which issued on June 23, 1936, as Patent No. 2,044,852 and to employ these devices in connection with arrangements whose operation involves the said switching over of the antenna system.

In devices according to this application the arriving signals are led to a transformer connected to a pointer instrument that in the vicinity of the zero position of its pointer is very sensitive while being considerably less sensitive in the outer positions thereof. The transformer acts to produce voltage peaks which cause the pointer to be deflected in one or the other direction according to whether a dot- or a dash-signal is arriving or preponderating. When then the next following voltage impulse arrives which is active in the opposite direction to the former, the pointer is in a zone of less sensitiveness, so that the first voltage impulse still controls and thus the side is indicated on which the vehicle is off the proper course. Such a device is particularly adapted for use with those direction finding methods with which, as before stated, on the receiving side the antenna system is keyed. This mode is suitable for visual indication, but an audible indication can be performed too by attaching the hearing device to a part located in the circuit ahead of the said transformer.

One embodiment of the invention is described hereafter by way of example, reference being had to the accompanying drawing.

Figure 2:
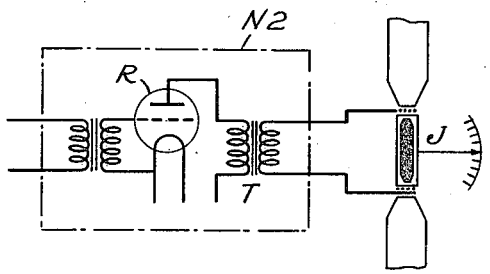

In the drawing Figure 1 illustrates diagrammatically one embodiment of the invention and;

Figure 2 is a diagram showing the connection of the instrument J with the stage N2.

The arrangement represented has two frame aerials or loops R1, R2 which are wound in an opposite sense and have a high antenna effect adapted for the purpose of the invention. Instead of this antenna arrangement others may be used, such as those above mentioned. A device S serves to connect the aerials R1, R2 alternately and in a dot-dash rhythm to the input circuit of a high frequency amplifier V. A device K serves for controlling the device S and may comprise a motor and a commutator device driven by the motor. Connected to the amplifier V is a rectifier or audion A.

It is here very advantageous however to avoid rotary means, such as motor and commutator, by making use of the well known tripping devices, so as to employ these for accomplishing the said switching over. All the tripping connections customary especially in the television art are adapted for this purpose, no matter whether they are operating with simple glow discharge lamps, or with grid-controlled electron tubes, or with grid-controlled gaseous discharge tubes. The tripping periods are so calculated that the switching over is effected in the dot-dash-rhythm, the time relations being about 1:6 or 1:8. The high frequency signals after having been amplified in device V and rectified in audion A are led to an indicating device to which a pair of headphones H and a pointer instrument J are connected.

In the case represented there is a receiver E which by its first or input part serves purposes that have nothing to do with the invention, being intended for instance to receive energy arriving from ultrashort wave slip-way beacons or the like. But the low frequency portion N1 of receiver E and the indicating instruments, such as H, J, for the slip-way, for example, form part also of the arrangement embodying the invention.

In portion N1 a low frequency amplification is effected. Connected to the output circuit of the arrangement E, N1 is the device H for the audible indication. The arrangement as thus far described is completed by the arrangement for the visual indication, which comprises a portion N2 and the pointer instrument J. Portion N2 contains the said transformer for producing the voltage peaks. The instrument J is of the construction referred to before, being very sensitive in the position of rest of its pointer or in the vicinity of such position, and less sensitive in the outer positions of the pointer. Referring to Figure 2 the received signals are transmitted to the tube R and are rectified in this tube. The primary winding of the transformer T is provided in the anode circuit of the tube and the signals create current impulses in said winding. Thus potential impulses are also produced in the secondary winding of the transformer T which operate the instrument J. As normally the instrument is in its mid-position and as it is very sensitive in this position, as mentioned above, the instrument is deflected to one side by the first arriving impulse and is then brought into the range of lower sensitivity thereof. The second impulse occurring at the decay of the signal has therefore no great influence on the pointer. The deflection of the instrument J to one or the other side will be effected in accordance with the kind of the received signal. If both signals are received with the same intensity the pointer of the instrument will remain in its mid-position thus indicating that the correct direction is obtained.

What is claimed is:

1. In a direction finding arrangement, a high frequency receiver, an antenna system consisting of two equal parts connected in opposite relation, means for switching these alternately to said receiver in dot dash rhythm, a transformer for producing voltage peaks, means for impressing the received signals on this transformer, and a pointer instrument connected fixedly to the secondary of said transformer for operation by said voltage peaks, this instrument being less sensitive in the outer positions of its pointer than in the vicinity of the zero position thereof.

2. A direction finding arrangement according to claim 1, wherein the means for the said switching over of the antenna system consists in devices adapted to produce tripping oscillations.

ERNST KRAMAR.